United States Patent
Fukuyama et al.

(10) Patent No.: US 9,960,435 B2
(45) Date of Patent: May 1, 2018

(54) FUEL-CELL-STACK MANUFACTURING METHOD AND FUEL-CELL-STACK

(71) Applicants: Nissan Motor Co., Ltd., Yokohama-shi, Kanagawa (JP); NHK Spring Co., Ltd., Yokohama-shi, Kanagawa (JP)

(72) Inventors: Yosuke Fukuyama, Kanagawa (JP); Takeshi Shiomi, Kanagawa (JP); Yusuke Terada, Kanagawa (JP); Norihiro Tajima, Kanagawa (JP)

(73) Assignee: Nissan Motor Co., Ltd., Yokohama (JP)

(*) Notice: Subject to any disclaimer, the term of this patent is extended or adjusted under 35 U.S.C. 154(b) by 162 days.

(21) Appl. No.: 14/901,136

(22) PCT Filed: Jun. 2, 2014

(86) PCT No.: PCT/JP2014/064628
§ 371 (c)(1),
(2) Date: Dec. 28, 2015

(87) PCT Pub. No.: WO2015/011989
PCT Pub. Date: Jan. 29, 2015

(65) Prior Publication Data
US 2016/0133948 A1 May 12, 2016

(30) Foreign Application Priority Data

Jul. 22, 2013 (JP) ................. 2013-152012

(51) Int. Cl.
*H01M 8/026* (2016.01)
*H01M 8/0297* (2016.01)
(Continued)

(52) U.S. Cl.
CPC ....... *H01M 8/0297* (2013.01); *H01M 8/0206* (2013.01); *H01M 8/026* (2013.01);
(Continued)

(58) Field of Classification Search
CPC ... H01M 8/0297; H01M 8/0228; H01M 8/248
See application file for complete search history.

(56) References Cited

U.S. PATENT DOCUMENTS

2005/0164077 A1* 7/2005 Bacon ................. H01M 8/2475
429/66
2015/0037706 A1* 2/2015 Fukuyama ............. H01M 8/02
429/468

(Continued)

FOREIGN PATENT DOCUMENTS

EP 2 826 093 A1 1/2015
EP 2 846 685 A1 3/2015
(Continued)

*Primary Examiner* — Imran Akram
(74) *Attorney, Agent, or Firm* — Global IP Counselors, LLP

(57) ABSTRACT

A fuel-cell-stack manufacturing method, includes arranging an extension portion extended from a proximal end of a raised piece on one surface of a base material disposed so as to abut at least one of a cathode side separator and the anode side separator, and setting an interval between the anode side separator and the cathode side separator along a lamination direction so that deformation of the raised piece exceeds an elastic deformation region and enters a plastic deformation region, and is also in a region in which the proximal end moved due to the deformation does not come in contact with the cathode side separator or the anode side separator.

15 Claims, 7 Drawing Sheets

(51) Int. Cl.
*H01M 8/2483* (2016.01)
*H01M 8/0271* (2016.01)
*H01M 8/0258* (2016.01)
*H01M 8/0267* (2016.01)
*H01M 8/2404* (2016.01)
*H01M 8/0206* (2016.01)
*H01M 8/0254* (2016.01)
*H01M 8/1018* (2016.01)

(52) U.S. Cl.
CPC ....... *H01M 8/0254* (2013.01); *H01M 8/0258* (2013.01); *H01M 8/0267* (2013.01); *H01M 8/0271* (2013.01); *H01M 8/2404* (2016.02); *H01M 8/2483* (2016.02); *H01M 2008/1095* (2013.01); *Y02P 70/56* (2015.11)

(56) References Cited

U.S. PATENT DOCUMENTS

| | | | |
|---|---|---|---|
| 2015/0056537 A1* | 2/2015 | Yagi | H01M 8/0247 |
| | | | 429/495 |
| 2015/0079488 A1* | 3/2015 | Iritsuki | H01M 8/2465 |
| | | | 429/434 |
| 2015/0086893 A1* | 3/2015 | Fukuyama | H01M 8/241 |
| | | | 429/437 |

FOREIGN PATENT DOCUMENTS

| | | |
|---|---|---|
| EP | 3 001 488 A1 | 3/2016 |
| JP | 4432518 B2 | 1/2010 |
| JP | 2012-248460 A | 12/2012 |
| WO | 2013/137470 A1 | 9/2013 |

\* cited by examiner

FUEL-CELL-STACK MANUFACTURING METHOD AND FUEL-CELL-STACK

CROSS-REFERENCE TO RELATED APPLICATIONS

This application is a U.S. National stage application of International Application No. PCT/JP2014/064628, filed Jun. 2, 2014, which claims priority to Japanese Patent Application No. 2013-152012 filed in Japan on Jul. 22, 2013, the contents of each of which are herein incorporated by reference.

BACKGROUND

Field of the Invention

The present invention relates to a fuel-cell-stack manufacturing method and a fuel-cell-stack.

Background Information

Conventionally, a fuel-cell-stack is configured by alternately laminating a separator and a membrane electrode assembly. Since, in a fuel-cell-stack, high output can be obtained in accordance with the number of the laminations of the separators and the membrane electrode assemblies, increasing the number of laminations is desirable. The conduction resistance can be reduced and a desired battery performance can be achieved by sufficiently putting the plurality of laminated separators and the membrane electrode assemblies in close contact with each other.

In a separator unit comprising an anode side separator and a cathode side separator, the portion of the flow channel for the fuel gas (hydrogen) and the cooling water of the anode side separator, and the portion of the flow channel for the oxidant gas (the air containing oxygen or pure oxygen) and the cooling water of the cathode side separator, are formed from fine convex/concave shapes, and have high dimensional tolerances.

Accordingly, there is a configuration to arrange a pressurizing plate corresponding to a deformation absorption member comprising a spring function between the flow channel portion of the anode side separator and the flow channel portion of the cathode side separator of the separator unit. By using such a deformation absorption member, uniformly applying pressure becomes possible without damaging the convex/concave shaped portion that becomes the flow channel, even if a high pressing force is applied to the separator unit (for example refer to Japanese Patent No. 4432518).

SUMMARY

Here, the load applied from the separator unit is absorbed by deforming a raised piece of the deformation absorption member disposed inside the separator unit, and a technique that is capable of optimizing the amount of the deformation of the raised piece so as to increase the load which the raised piece can receive has been in demand.

In order to solve the problem described above, an object of the present invention is to provide a fuel-cell-stack manufacturing method and a fuel-cell-stack that are capable of increasing the load that a raised piece of a deformation absorption member can receive from the separator unit.

In the fuel-cell-stack manufacturing method according to the present invention which achieves the object above, a separator unit, a deformation absorption member, and a membrane electrode assembly are used. The separator unit comprises an anode side separator and a cathode side separator. The deformation absorption member is disposed between the anode side separator and the cathode side separator, and comprises a thin-board-like base material, and a plurality of raised pieces, which are raised from one surface of the base material in a grid pattern. The membrane electrode assembly is adjacent to the separator unit, and is formed by joining an anode and a cathode so as to face an electrolyte membrane. The fuel-cell-stack manufacturing method comprises an arrangement step and a setting step. In the arrangement step, an extension portion extended from the proximal end of a raised piece disposed on one surface of the base material is disposed so as to be abutted to the cathode side separator or the anode side separator. The setting step sets the interval between the anode side separator and the cathode side separator along the lamination direction so that the deformation of the raised piece exceeds an elastic deformation region and enters a plastic deformation region, and is also in a region in which the proximal end that is moved due to the deformation will not come in contact with the cathode side separator or the anode side separator.

A fuel-cell-stack manufacturing method according to the present invention which achieves the object above comprises a separator unit, a deformation absorption member, and a membrane electrode assembly. The separator unit comprises an anode side separator and a cathode side separator. The deformation absorption member is disposed between the anode side separator and the cathode side separator, and comprises a thin-board-like base material, and a plurality of raised pieces, which are raised from one surface of the base material in a grid pattern. The deformation absorption member causes an extension portion extended from the proximal end of a raised piece to abut the cathode side separator or the anode side separator. The membrane electrode assembly is adjacent to the separator unit, and is formed by joining an anode and a cathode so as to face an electrolyte membrane. Here, the anode side separator and the cathode side separator are arranged while applying a load so that the deformation of the raised piece exceeds an elastic deformation region and enters a plastic deformation region, and is also in a region in which the proximal end that is moved due to the deformation will not come in contact with the cathode side separator or the anode side separator.

BRIEF DESCRIPTION OF THE DRAWINGS

Referring now to the attached drawings which form a part of this original disclosure.

DETAILED DESCRIPTION OF THE EMBODIMENTS

Figure 1:
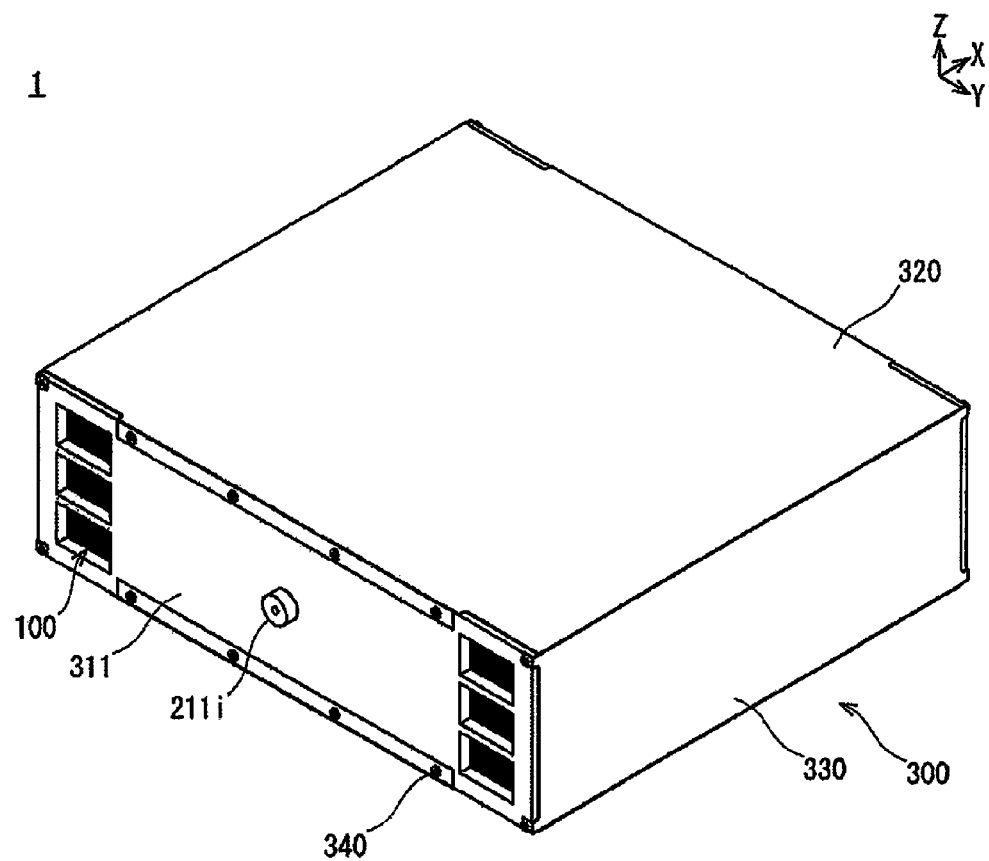
FIG. 1 is a perspective view illustrating the fuel-cell-stack according to an embodiment.

Embodiments according to the present invention will be described below, with reference to the appended drawings. In the explanations of the drawings, the same elements are given the same codes, and overlapping explanations are omitted. The sizes and ratios of the members in the drawing are exaggerated for convenience of explanation, and may be different from the actual sizes and ratios.

Embodiments

The manufacturing method of the fuel-cell-stack 1 and the fuel-cell-stack 1 according to the embodiment will be described with reference to FIG. 1-FIG. 11.

First, the configuration of the fuel-cell-stack 1 will be described with reference to FIG. 1-FIG. 5.

Figure 2:
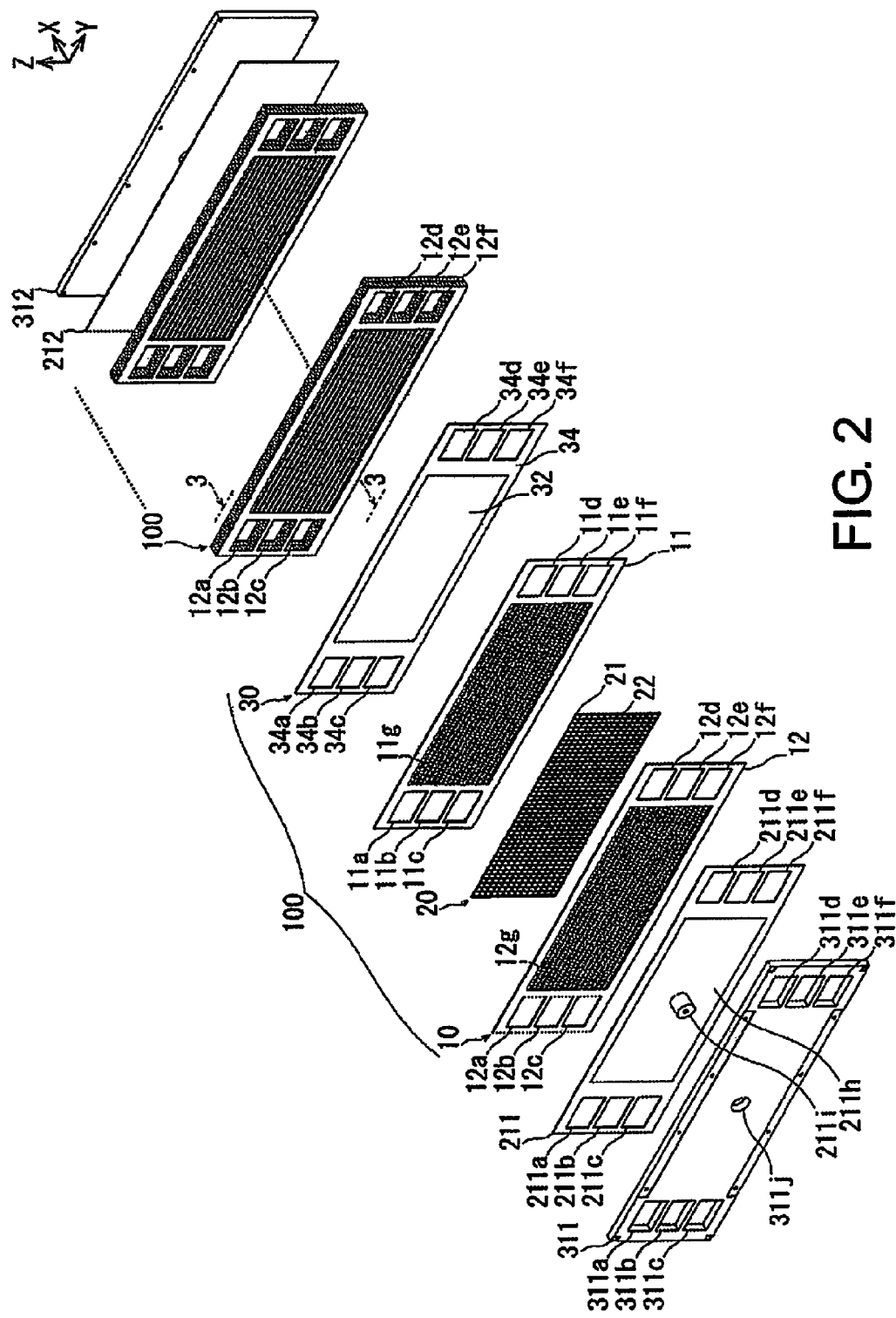
FIG. 2 is an exploded perspective view illustrating a part of the fuel-cell-stack according to the embodiment, exploded per each component member.
Figure 3:
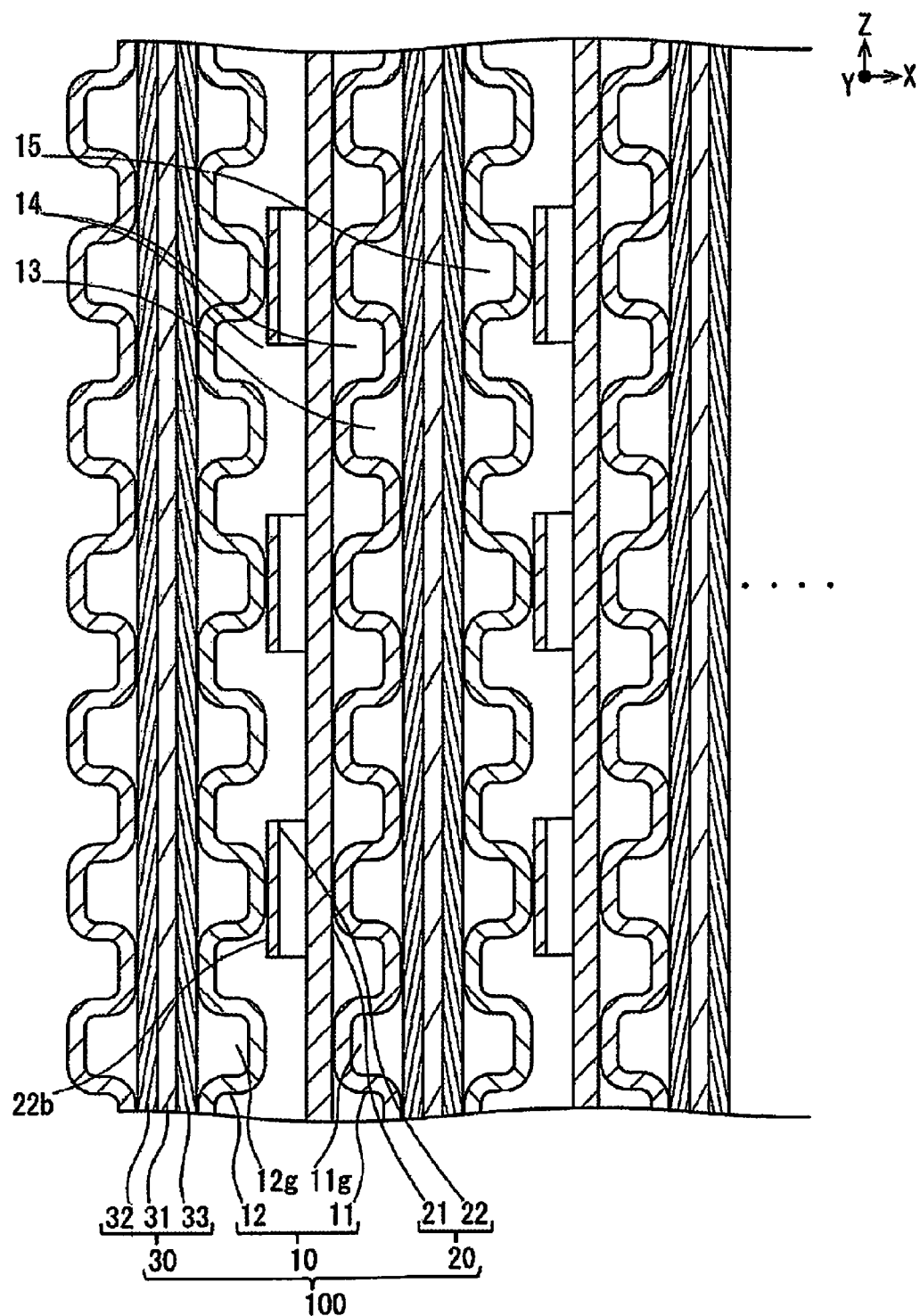
FIG. 3 is a cross-sectional view illustrating the separator unit, the deformation absorption member, and a part of the membrane electrode assembly, of the fuel-cell-stack according to the embodiment.
Figure 4:
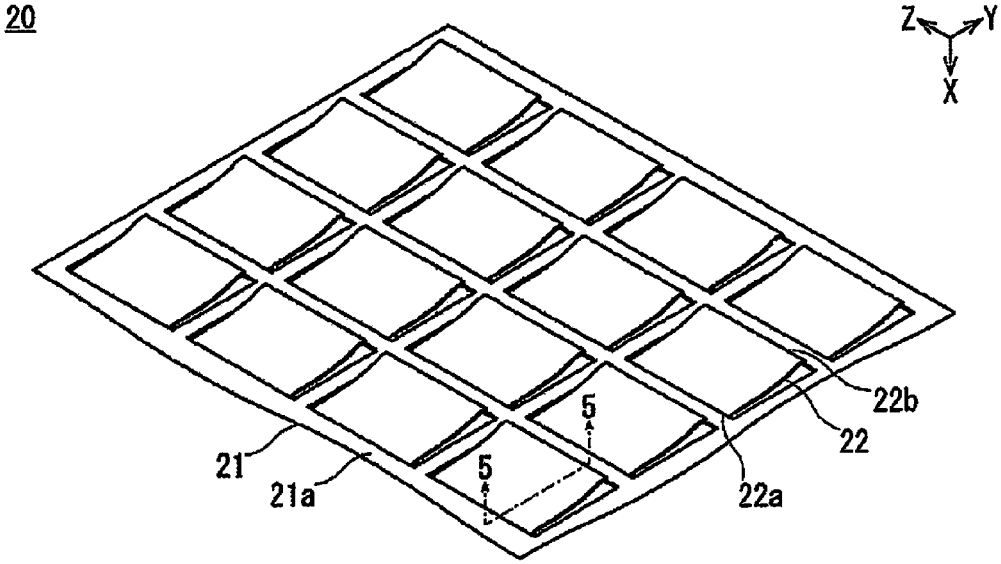
FIG. 4 is a perspective view illustrating the deformation absorption member of the fuel-cell-stack according to the embodiment.
Figure 5:
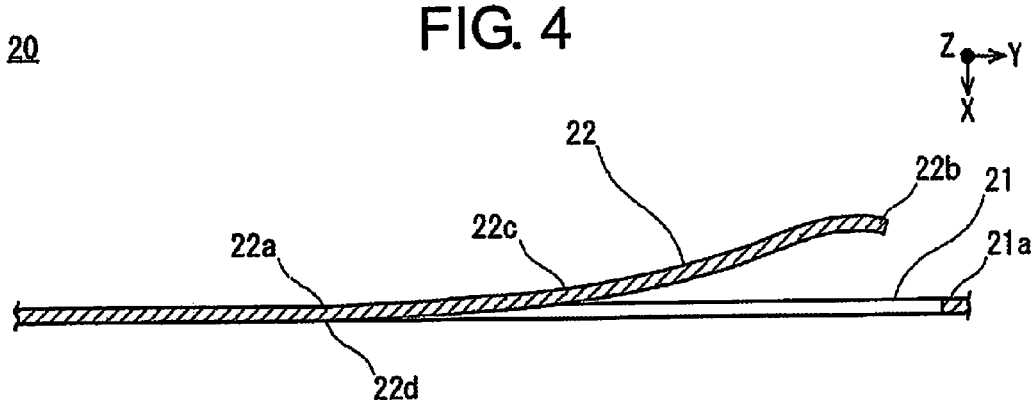
FIG. 5 is a cross-sectional view schematically illustrating principal parts of the deformation absorption member of the fuel-cell-stack according to the embodiment.
Figure 6:
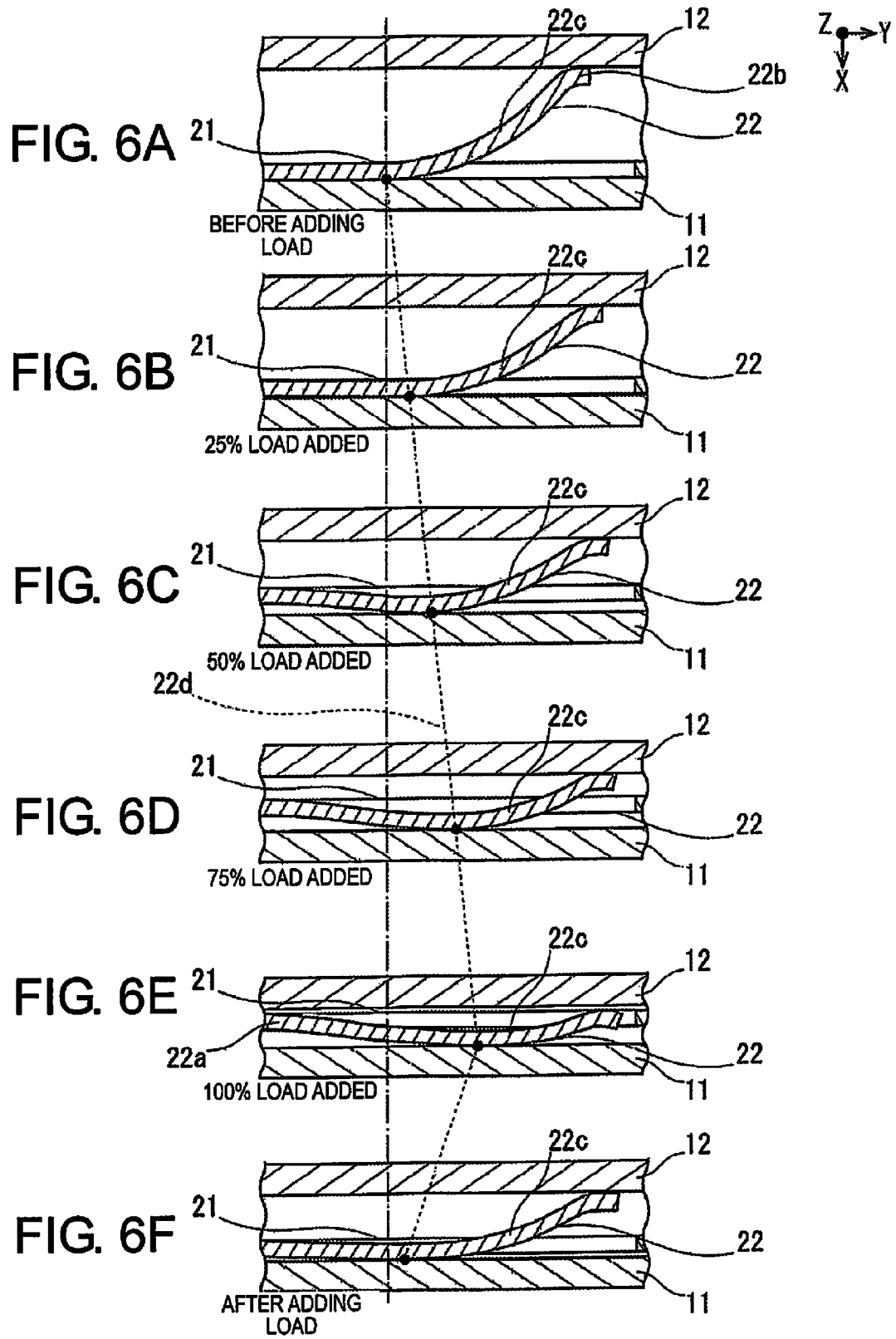
FIGS. 6A-6F are a schematic views illustrating changes in the shape of the deformation absorption member, at the time of assembling the fuel-cell-stack according to the embodiment.

FIG. 1 is a perspective view illustrating the fuel-cell-stack 1 according to the embodiment. FIG. 2 is an exploded perspective view illustrating a part of the fuel-cell-stack 1, exploded per each component member. FIG. 3 is a cross-sectional view illustrating the separator unit 10, the deformation absorption member 20, and a part of the membrane electrode assembly 30, of the fuel-cell-stack 1. FIG. 3 shows along the 3-3 line in FIG. 2. FIG. 4 is a perspective view illustrating the deformation absorption member 20 of the fuel-cell-stack 1. FIG. 5 is a cross-sectional view schematically illustrating the principal parts of the deformation absorption member 20 of the fuel-cell-stack 1. FIG. 5 shows along the 5-5 line in FIG. 4.

The fuel-cell-stack 1 according to the embodiment comprises the fuel cells 100 which generate power, a pair of the collector plates 211 and 212 for transmitting the power generated by the fuel cells 100 to the outside, and a chassis 300 that holds a plurality of fuel cells 100 laminated together and a pair of the collector plates 211 and 212. Each configuration of the fuel-cell-stack 1 will be explained in order below.

The fuel cell 100 is illustrated in FIG. 1-FIG. 3, and generates power from the supplied fuel gas (the hydrogen) and the oxidant gas (the air containing oxygen or the pure oxygen), in a state in which a plurality thereof are laminated together.

The fuel cell 100 comprises a separator unit 10, a deformation absorption member 20, and a membrane electrode assembly 30. Each member included in the fuel cell 100 will be described below.

The separator unit 10 is illustrated in FIG. 2 and FIG. 3, isolates the adjacent membrane electrode assemblies 30 while conducting the power that is generated in the membrane electrode assembly 30, and comprises the flow channels for the cooling water and the fuel gas (the hydrogen) or the oxidant gas (the air containing oxygen or the pure oxygen). The separator unit 10 comprises an anode side separator 11 and a cathode side separator 12. The anode side separator 11 is abutted with an anode 32 of the membrane electrode assembly 30. The anode side separator 11 is made of a conductive metal material, and is formed into a thin plate shape that is larger than the anode 32.

A plurality of convex/concave shapes are formed at regular intervals in the center of the anode side separator 11 so as to configure a flow channel portion 11g to a flow fuel gas (the hydrogen) and the cooling water at intervals, as illustrated in FIG. 3. Of the convex/concave shapes, the anode side separator 11 uses the closed space formed by contacting the anode 32 as an anode gas flow channel 13 for supplying hydrogen to the anode 32. On the other hand, of the convex/concave shapes, the anode side separator 11 uses the closed space formed between the cathode side separator 12, interposing the deformation absorption member 20, as a cooling water flow channel 14 for supplying the cooling water.

The anode side separator 11 is formed from the rectangles, and the through-holes corresponding to a cathode gas inlet 11a, a cooling fluid inlet 11b, and an anode gas inlet 11c are opened on the one end in the longitudinal direction. Similarly, through-holes corresponding to an anode gas outlet 11d, a cooling fluid outlet 11e, and a cathode gas outlet 11f are opened on the other end of the anode side separator 11 in the longitudinal direction.

The cathode side separator 12 is abutted with a cathode 33 of the membrane electrode assembly 30. The cathode side separator 12 is made of a conductive metal material, and is formed into a thin plate shape that is larger than the cathode 33.

A plurality of convex/concave shapes are formed at regular intervals in the center of the cathode side separator 12 so as to configure a flow channel portion 12g to flow the oxidant gas (the air containing oxygen or the pure oxygen) and the cooling water at intervals, as illustrated in FIG. 3. The convex/concave shapes are made by alternately combining the U-shapes, or alternately combining the semicircular shapes. Of the convex/concave shapes, the cathode side separator 12 uses the closed space formed by contacting the cathode 33 as a cathode gas flow channel 15 for supplying oxidant gas to the cathode 33. On the other hand, of the convex/concave shapes, the cathode side separator 12 uses the closed space formed between the cathode side separator 12, interposing the deformation absorption member 20, as a cooling water flow channel 14 for supplying the cooling water. That is, in adjacent fuel cells 100, a cooling water flow channel 14 of an anode side separator 11 of one fuel cell 100 and a cooling water flow channel 14 provided to a cathode side separator 12 of the other fuel cell 100 form one cooling water flow channel.

The cathode side separator 12 is made of the rectangles, and the through-holes corresponding to a cathode gas inlet 12a, a cooling fluid inlet 12b, and an anode gas inlet 12c are opened on the one end in the longitudinal direction. Similarly, the through-holes corresponding to an anode gas outlet 12d, a cooling fluid outlet 12e, and a cathode gas outlet 12f are opened on the other end of the cathode side separator 12 in the longitudinal direction.

The deformation absorption member 20 is illustrated in FIG. 2-FIG. 5, and absorbs the manufacturing errors in the convex/concave shapes which form the fuel gas and the cooling water flow channels of the anode side separator 11 and the cathode side separator 12 by deforming itself at the time of assembling the fuel-cell-stack 1. In addition, the deformation absorption member 20 absorbs displacements in the lamination direction X, caused by an expansion of the membrane electrode assembly 30 when absorbing the supplied medium, by deforming itself. In addition, the deformation absorption member 20 absorbs displacements in the lamination direction X, caused by a thermal expansion of a separator unit 10 that is heated by an adjacent membrane electrode assembly 30, by deforming itself during an operation of the fuel cell 100. Therefore, putting the plurality of laminated fuel cells 100 into close contact with each other by applying a high pressure is possible. The closer the plurality of laminated fuel cells 100 are in contact with each other, the more the conduction resistance between the fuel cells 100 is reduced, to improve the power generation efficiency.

The deformation absorption member 20 is made of a metal having electrical conductivity, and is formed in a thin plate shape, as illustrated in FIG. 4. The deformation absorption member 20 is disposed between the anode side separator 11 and the cathode side separator 12, and comprises a thin-board-like base material 21, and a plurality of raised pieces 22, each of which is raised from one surface 21a of the base material 21 in a grid pattern. That is, in the deformation absorption member 20, the raised pieces 22 are made by punching out U-shapes from the base material 21, corresponding to one thin plate, which are then raised and cantilevered, and arranged in a grid pattern. Since the raised pieces 22 comprise a cantilever structure with respect to the base material 21, the pieces have the function of a spring that can be elastically deformed.

The raised piece 22 is formed in a rectangular shape in which, for example, the width of a fixed end portion 22a on the proximal end side of the raised piece 22 disposed on one surface 21a of the base material 21 is equal to the width of a free end portion 22b of an extension portion side, which is extended along one direction Y from the fixed end portion 22a, as illustrated in FIG. 4. For example, the plurality of raised pieces 22 are formed so that the directions of the free end portions 22b are aligned in a plurality of rows along another direction Z which intersects the one direction Y. In the raised pieces 22, the free end portion 22b on the extension portion side extended from the fixed end portion 22a on the proximal end side of the raised pieces 22 disposed on one surface 21a of the base material 21, is abutted against the cathode side separator 12, as illustrated in FIG. 3.

The raised piece 22 comprises a curved portion 22c, which is curved protruding in a convex shape toward a direction separating from the cathode side separator 12, in a region between the fixed end portion 22a and the free end portion 22b, as illustrated in FIG. 5. The raised piece 22 includes a load supporting point 22d for supporting a load received from the anode side separator 11, on the side of the curved portion 22c that opposes the anode side separator 11.

The load supporting point 22d is moved to the free end portion 22b side along with the deformation of the raised piece 22.

The membrane electrode assembly 30 is illustrated in FIG. 2 and FIG. 3, and generates the electric power by chemically reacting the supplied oxygen and the hydrogen. The membrane electrode assembly 30 is formed by joining an anode 32 and a cathode 33 so as to face each other via an electrolyte membrane 31. The membrane electrode assembly 30 is commonly referred to as the MEA (the membrane electrode assembly). The electrolyte membrane 31 is, for example, made of a solid polymer material, and is formed in a thin plate shape. For example, a fluorine-based resin which conducts hydrogen ions and has good electrical conductivity in a wetted state is used as the solid polymer material. The anode 32 is configured by laminating an electrode catalyst layer, a water-repellent layer, and a gas diffusion layer, and is formed in a thin plate shape that is slightly smaller than the electrolyte membrane 31. The cathode 33 is configured by laminating an electrode catalyst layer, a water-repellent layer, and a gas diffusion layer, and is formed in a thin plate shape with the same size as the anode 32. The electrode catalyst layers of the anode 32 and the cathode 33 include a polymer electrolyte and an electrode catalyst in which the catalyst component is carried on a conductive carrier. The gas diffusion layers of the anode 32 and the cathode 33 are formed from a carbon cloth, a carbon paper, or a carbon felt, which are woven with the yarns comprising the carbon fibers that have a sufficient gas diffusibility and conductivity.

The membrane electrode assembly 30 comprises a frame 34. The frame 34 integrally holds the outer perimeters of the electrolyte membrane 31, the anode 32, and the cathode 33. The frame 34 is made of, for example, a resin having the electrical insulating properties, and is formed with an external shape that is the same as the external shape of the outer perimeter portion of the separator unit 10. The through-holes corresponding to a cathode gas inlet 34a, a cooling fluid inlet 34b, and an anode gas inlet 34c are opened on one end of the frame 34 in the longitudinal direction. Similarly, the through-holes corresponding to an anode gas outlet 34d, a cooling fluid outlet 34e, and a cathode gas outlet 34f are opened on the other end of the frame 34 in the longitudinal direction.

A plurality of fuel cells 100 need to be laminated together in a state of being sealed to each other. Accordingly, the outer perimeters of the adjacent fuel cells 100 are sealed with a sealing member. For example, a thermosetting resin is used as the sealing member. The thermosetting resin is selected from, for example, the phenol resins, the epoxy resins, the unsaturated polyesters, or the like.

The pair of collector plates 211 and 212 are illustrated in FIG. 2, and transmit the power generated by the fuel cells 100 to the outside.

The pair of collector plates 211 and 212 are respectively disposed on the two ends of the plurality of fuel cells 100 laminated together. The external shape of the pair of the collector plates 211 and 212, with the exception of some of the shape, is the same as the external shape of the membrane electrode assembly 30 with a slightly thicker layer thickness. Among the pair of collector plates 211 and 212, the through-holes corresponding to a cathode gas inlet 211a, a cooling fluid inlet 211b, and an anode gas inlet 211c are opened on one end of only the collector plate 211 in the longitudinal direction. Similarly, through-holes corresponding to an anode gas outlet 211d, a cooling fluid outlet 211e, and a cathode gas outlet 211f are opened on the other end of only the collector plate 211 in the longitudinal direction. The pair of collector plates 211 and 212 include a collector portion 211h, etc., in the center.

The collector portion 211h, etc., of the pair of the collector plates 211 and 212 is made of a conductive member that does not permeate gas, such as a dense carbon, and is formed in a thin plate shape that is slightly smaller than the outer shapes of the anode 32 and the cathode 33. The pair of collector portions 211h, etc., abut with the anode 32 or the cathode 33 of the membrane electrode assembly 30 disposed on the outermost of the plurality of laminated fuel cells 100. A conductive cylindrical protrusion 211i, etc., protrudes from one surface of the collector portion 211h, etc. The protrusion 211i, etc., extend through the through-holes 311j, etc., of a pair of end plates 311 and 312 of the chassis 300 described below.

The chassis 300 is illustrated in FIG. 1 and FIG. 2, and holds the plurality of fuel cells 100 laminated together and the pair of the collector plates 211 and 212, in a state of being in close contact with each other.

The chassis 300 comprises a pair of the end plates 311 and 312, a pair of the fastening plates 320, a pair of the reinforcing plates 330, and the screws 340. Each member included in the chassis 300 will be described below. The pair of end plates 311 and 312 sandwich and bias the pair of the collector plates 211 and 212, disposed on the two ends of the plurality of fuel cells 100 laminated together. The external shape of the pair of the collector plates 311 and 312, with the exception of some of the shape, is the same as the external shape of the membrane electrode assembly 30 with an increased layer thickness. The pair of the end plates 311 and 312 are, for example, made of a metal, and an insulator is disposed in a portion that is abutted with the pair of the collector plates 211 and 212. Among the pair of the end plates 311 and 312, the through-holes corresponding to a cathode gas inlet 311a, a cooling fluid inlet 311b, and an anode gas inlet 311c are opened on one end of only the end plate 311 in the longitudinal direction. Similarly, the through-holes corresponding to an anode gas outlet 311d, a cooling fluid outlet 311e, and a cathode gas outlet 311f are opened on the other end of only the end plate 311 in the longitudinal direction. A through-hole 311j, etc., for extending through the protrusion 211i, etc., of the pair of the collector plates 211 and 212 are opened on the pair of end plates 311 and 312.

The pair of the fastening plates 320 are made of, for example, a metal, and are formed in a plate shape. The pair of the fastening plates 320 holds the pair of the end plates 311 and 312 from both sides in the longitudinal direction so as to face each other. The pair of the reinforcing plates 330 are made of, for example, a metal, and are formed in a plate shape that is more elongated than the pair of the fastening plates 320. The pair of the reinforcing plates 330 holds the pair of the end plates 311 and 312 from both sides in the lateral direction so as to face each other. The pair of the fastening plates 320 and the pair of the reinforcing plates 330 are fixed to the pair of the end plates 311 and 312 by a plurality of screws 340.

Next, the manufacturing method of the fuel-cell-stack 1 will be described with reference to FIG. 6A-FIG. 9.

Figure 7:
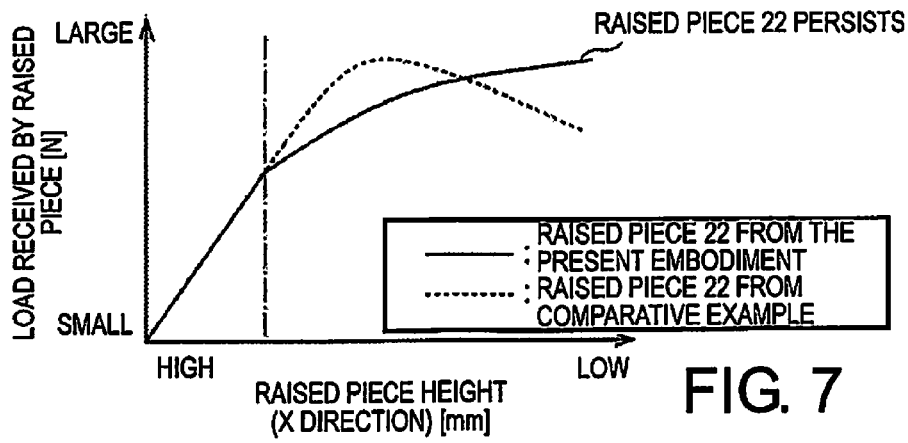
FIG. 7 is a view illustrating a comparison between the withstand load of the deformation absorption member according to the embodiment, and the withstand load of the deformation absorption member according to a Comparative Example.
Figure 8:
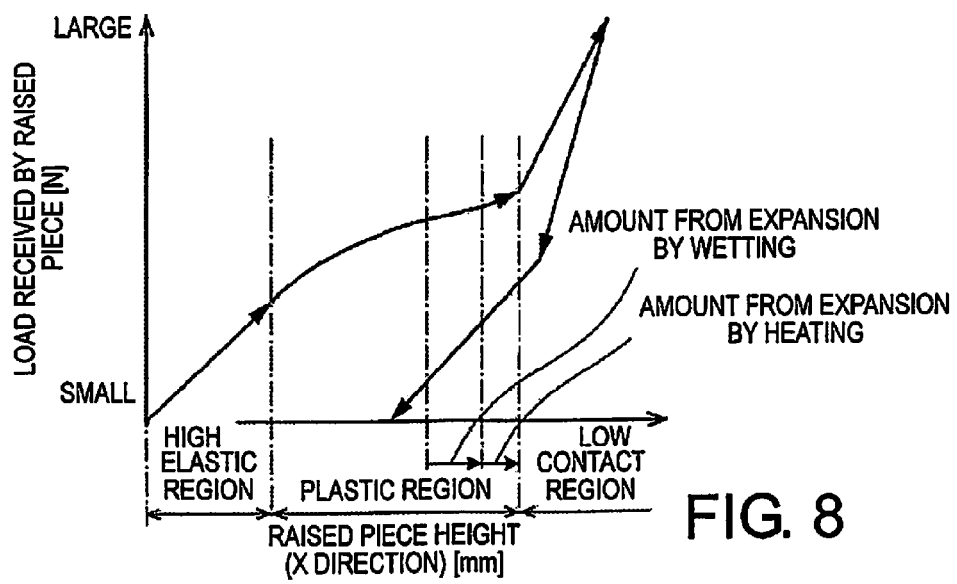
FIG. 8 is a view illustrating a state in which the height of the raised piece of the deformation absorption member of the fuel-cell-stack according to the embodiment is set with consideration for the expansion of the other lamination members.
Figure 9:
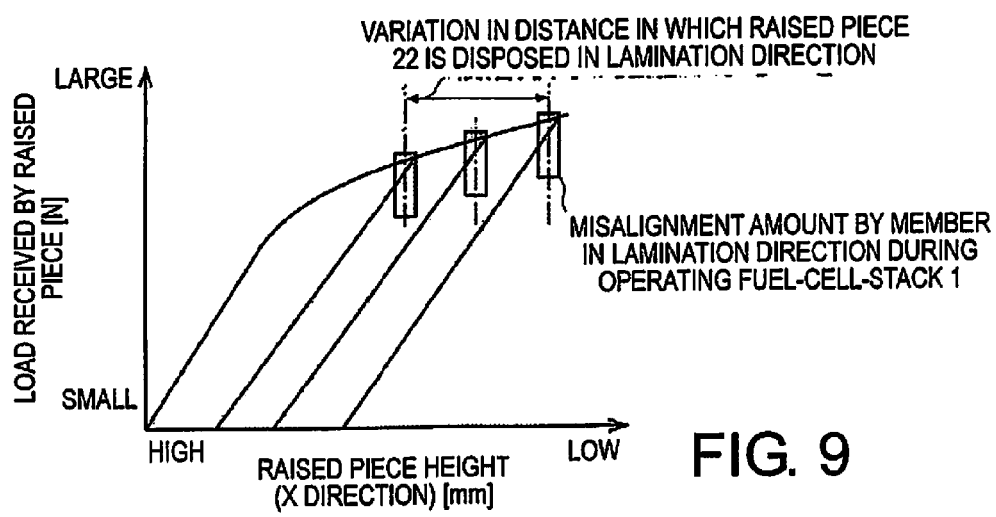
FIG. 9 is a view illustrating a state in which the height of the raised piece of the deformation absorption member of the fuel-cell-stack according to the embodiment is set with consideration for the manufacturing error of the other lamination members and the misalignment amount during the operation (the power generation).

FIGS. 6A-6F are schematic views illustrating changes in the shape of the deformation absorption member 20, at the time of assembling the fuel-cell-stack 1. FIG. 7 is a view illustrating a comparison between the withstand load of the deformation absorption member 20 of the fuel-cell-stack 1, and the withstand load of the deformation absorption member according to a Comparative Example. FIG. 8 is a view illustrating a state in which the height of the raised piece 22 of the deformation absorption member 20 of the fuel-cell-stack 1 is set with consideration for the expansion of the other lamination members. FIG. 9 is a view illustrating a state in which the height of the raised piece 22 of the deformation absorption member 20 of the fuel-cell-stack 1 is set with consideration for the manufacturing error of the other lamination members and the misalignment amount during operation (power generation).

FIGS. 6A-6F illustrates changes in the shape of the deformation absorption member 20, at the time of assembling the fuel-cell-stack 1.

As illustrated in FIG. 6A, in the deformation absorption member 20 disposed between the anode side separator 11 and the cathode side separator 12, the free end portion 22b of the raised piece 22 is abutted to the cathode side separator 12, and the base material 21 is abutted to the anode side separator 11. The pressure is gradually applied to the separator unit 10 from the outward side, as illustrated in FIG. 6B-FIG. 6E. Specifically, the pressure is applied to the plurality of alternately laminated separator units 10 and the membrane electrode assemblies 30 from both the ends. During this step, the raised piece 22 undergoes a plastic deformation after an elastic deformation, and the fixed end portion 22a thereof separates from the base material 21 as well as the anode side separator 11, to approach the cathode side separator 12. Following the deformation of the curved portion 22c, the load supporting point 22d of the raised piece 22 is moved to the free end portion 22b side, as illustrated in FIG. 6A-FIG. 6E. The pressure applied to the separator unit 10 is released, as illustrated in FIG. 6F. At this time, the deformation absorption member 20 is displaced from the state illustrated in FIG. 6E to that of FIG. 6F. That is, the raised piece 22, which was greatly curved from the fixed end portion 22a to the free end portion 22b, is relaxed, and is extended in a certain range. At the same time, the fixed end portion 22a of the raised piece 22 is returned from the cathode side separator 12 side to the anode side separator 11 side, along with the base material 21.

FIG. 7 illustrates a comparison between the withstand load of the deformation absorption member 20 of the fuel-cell-stack 1 of the embodiment, and the withstand load of the deformation absorption member according to a Comparative Example.

The fuel-cell-stack 1 of the embodiment is manufactured so that, when the raised piece 22 of the deformation absorption member 20 disposed between the anode side separator 11 and the cathode side separator 12 receives a load and is deformed, the curved portion 22c thereof is abutted to the anode side separator 11. By using such a manufacturing method, the raised piece 22 is able to gently receive the load applied from the anode side separator 11 with the curved portion 22c, and undergo a plastic deformation after an elastic deformation. Here, even if the raised piece 22 receives a load and is gradually deformed, the load received from the anode side separator 11 can be gradually increased and received, with the portion where the curved portion 22c is abutted to the anode side separator 11 acting as the load supporting point 22d. Since the load supporting point 22d of the curved portion 22c is moved to the free end portion 22b side following the deformation, a large change is not generated in the state in which the raised piece 22 and the anode side separator 11 apply pressure to each other. Therefore, during the step in which the raised piece 22 receives a load and is deformed, a situation in which, when exceeding a certain location, the load received from the separator unit 10 is rapidly increased, can be prevented. That is, the deformation absorption member 20 is able to cause the raised piece 22 to be persistent.

On the other hand, unlike the raised piece 22 of the deformation absorption member 20 described above, in the raised piece of the deformation absorption member according to the Comparative Example, the region excluding the free end portion is formed linearly. That is, the raised piece according to the Comparative Example does not comprise a curved portion in the region between the fixed end portion and the free end portion. In the case of a configuration such as this Comparative Example, the raised piece is deformed so as to be bent with the fixed end portion as a pivot; therefore, a large change is generated accompanying the deformation in the state in which the raised piece and the anode side separator 11 apply pressure to each other. Therefore, during the step in which the raised piece according to the Comparative Example receives a load and is deformed, when exceeding a certain location, the load received from the separator unit 10 is rapidly increased. In other words, in the raised piece according to the Comparative Example, when exceeding a predetermined location, the fixed end portion side is lifted, and, together with the free end portion, becomes a supported beam with both ends supported, which supports the cathode side separator 12, and the length of the raised piece is substantially shortened. In the case of such a configuration, the load that the raised piece according to the Comparative Example can receive from the separator unit 10 is greatly reduced.

FIG. 8 illustrates a state in which the height of the raised piece 22 of the deformation absorption member 20 of the fuel-cell-stack 1 is set with consideration for the expansion of the other lamination members.

The separator unit 10 sets the distance of the interval between the anode side separator 11 and the cathode side separator 12 along the lamination direction X to within the range of the plastic deformation region, from among the elastic deformation region, the plastic deformation region, and the fixed end portion side contact deformation region. The elastic deformation region is the distance along the lamination direction X of the deformation absorption member 20, when the raised piece 22 is deformed in the range of the elastic deformation. The plastic deformation region is shorter than the elastic deformation region, and is the distance along the lamination direction X of the deformation absorption member 20, when the raised piece 22 is deformed in the range of the plastic deformation. The fixed end portion side contact deformation region is shorter than the plastic deformation region, and is the distance along the lamination direction X of the deformation absorption member 20, when the raised piece 22 is deformed in a range in which the fixed end portion 22a of the raised piece 22 is moved and abutted with the cathode side separator 12 or the anode side separator 11.

Additionally, upon manufacture, the distance of the interval between the anode side separator 11 and the cathode side separator 12 along the lamination direction X is configured to be within the range of the plastic deformation, even if the separator unit 10 expands with the heat generated by the membrane electrode assembly 30, and if the membrane electrode assembly 30 is expanded after absorbing a medium supplied from outside. In FIG. 3, the portion where the separator unit 10 expands with the heat generated by the membrane electrode assembly 30 is described as the "amount of expansion caused by heating." Similarly, in FIG. 8, the portion where the membrane electrode assembly 30 is expanded after absorbing a medium supplied from outside is described as the "amount of expansion caused by wetting." This type of manufacturing method allows for a margin in the plastic deformation amount of the raised piece 22, assuming the expansion of the separator unit 10 and the membrane electrode assembly 30 under an actual use state in which the fuel-cell-stack 1 is operated. Even if the raised piece 22 is biased by the expanded separator unit 10 and the membrane electrode assembly 30 during the use of the fuel-cell-stack 1, the fixed end portion 22a side of the raised piece 22 being put in contact with the cathode side separator 12 and becoming in a state of a both ends supported beam can be prevented. Accordingly, the fuel-cell-stack 1 is able to prevent the load from being excessively increased during use after assembly. As a result, the damage, etc., of the member can be prevented, and an increase in the contact resistance can be suppressed.

Here, the "amount of expansion caused by heating" corresponding to the portion where the separator unit 10 expands with the heat generated by the membrane electrode assembly 30 can be calculated from the difference between the temperature during assembly of the fuel-cell-stack 1 and the temperature at the time of operating the fuel-cell-stack 1, the linear expansion coefficient specific to each lamination member, and the layer thickness. The "amount of expansion caused by wetting" corresponding to the portion where the membrane electrode assembly 30 is expanded after absorbing a medium supplied from outside can be measured by operating the fuel-cell-stack 1 to generate power and measuring the displacement of the layer thickness of the membrane electrode assembly 30 using a displacement sensor, etc. In addition, even when forming a single electrolyte layer 31 or a membrane electrode assembly 30, the layer or the assembly can be exposed to an equivalent humidity atmosphere as the operating state of the fuel-cell-stack 1, and the displacement of the layer thickness can be measured using a displacement sensor, etc.

FIG. 9 illustrates a state in which the height of the raised piece 22 of the deformation absorption member 20 of the fuel-cell-stack 1 is set with consideration for the manufacturing error of the other lamination members and the misalignment amount during operation (the power generation).

Upon manufacture, the dimensional tolerance of the interval between the anode side separator 11 and the cathode side separator 12 along the lamination direction X is configured to be greater than the sum of the displacement (the misalignment amount) along the lamination direction X, when the separator unit 10 expands with the heat generated by the membrane electrode assembly 30, and the membrane electrode assembly 30 is expanded after absorbing a medium supplied from outside. By using such a manufacturing method, the plurality of dimensional tolerances that occur when assembling by laminating each member of the fuel-cell-stack 1 can be absorbed at once. For example, in a state in which a plurality of membrane electrode assemblies 30 and the separator units 10 are laminated together, the different dimensional tolerances can be absorbed depending on the lamination position.

Next, the inspection during the manufacture of the fuel-cell-stack 1 will be described, with reference to FIG. 10 and FIG. 11.

Figure 10:
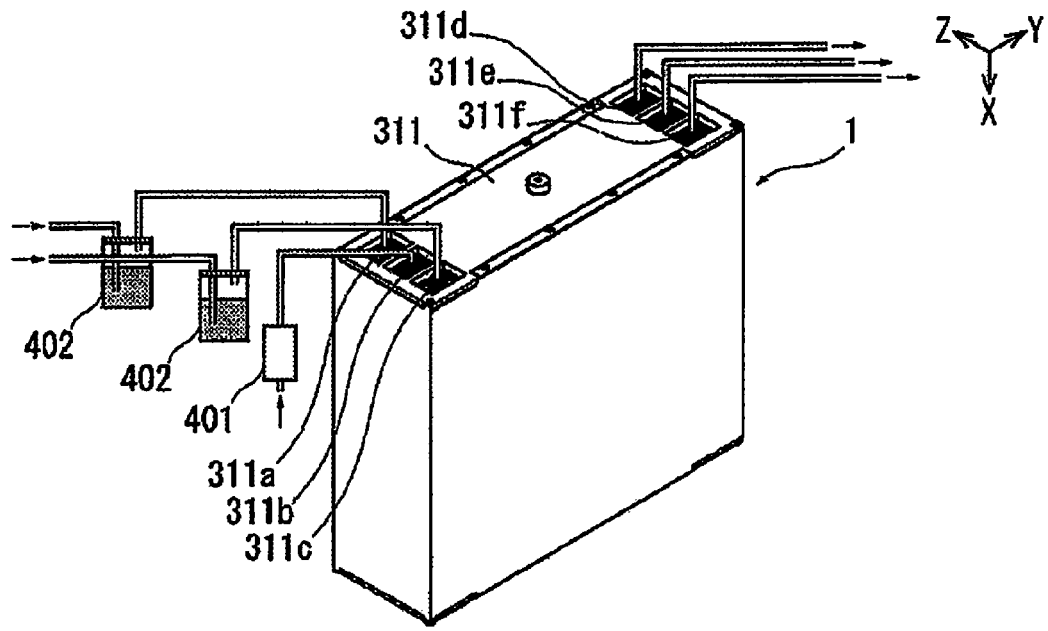
FIG. 10 is a perspective view schematically illustrating a state of carrying out a performance test of the fuel-cell-stack according to the embodiment.

FIG. 10 is a perspective view schematically illustrating a state of carrying out a performance test of the fuel-cell-stack 1. FIG. 11 is a view illustrating the change in the thickness of the membrane electrode assembly 30 accompanying the performance test of the fuel-cell-stack 1.

In an inspection during the manufacture of the fuel-cell-stack 1, the raised piece 22 is subjected to a further plastic deformation, using the pressure increase accompanying warming or humidifying that is executed after assembling the fuel-cell-stack 1. Specifically, a heated medium is supplied to the separator unit 10 to expand the separator unit 10, as illustrated in FIG. 10. By expanding the separator unit 10, the raised piece 22 is subjected to further plastic deformation while reducing the distance of the interval between the anode side separator 11 and the cathode side separator 12 along the lamination direction X to within the range of the plastic deformation region. Specifically, hot water heated by a heater 401 is supplied from the cooling fluid inlet 311*b* of the end plate 311, circulated in the plurality of alternately laminated separator units 10 and the membrane electrode assemblies 30 via the collector plate 211, then drained from the cooling fluid outlet 311*e*.

Further, a medium is supplied to the membrane electrode assembly 30 to humidify and expand the membrane electrode assembly 30, as illustrated in FIG. 10. By expanding the membrane electrode assembly 30, the raised piece 22 is subjected to further plastic deformation while reducing the distance of the interval between the anode side separator 11 and the cathode side separator 12 along the lamination direction X to within the range of the plastic deformation region. Specifically, a medium humidified by a humidifier 402 is injected from the anode gas inlet 311*c* of the end plate 311, circulated in the plurality of alternately laminated separator units 10 and the membrane electrode assemblies 30 via the collector plate 211, then drained from the anode gas outlet 311*d*. Similarly, a medium humidified by a humidifier 402 is injected from the cathode gas inlet 311*a* of the end plate 311, circulated in the plurality of alternately laminated separator units 10 and membrane electrode assemblies 30 via the collector plate 211, then drained from the cathode gas outlet 311*f*.

Figure 11:
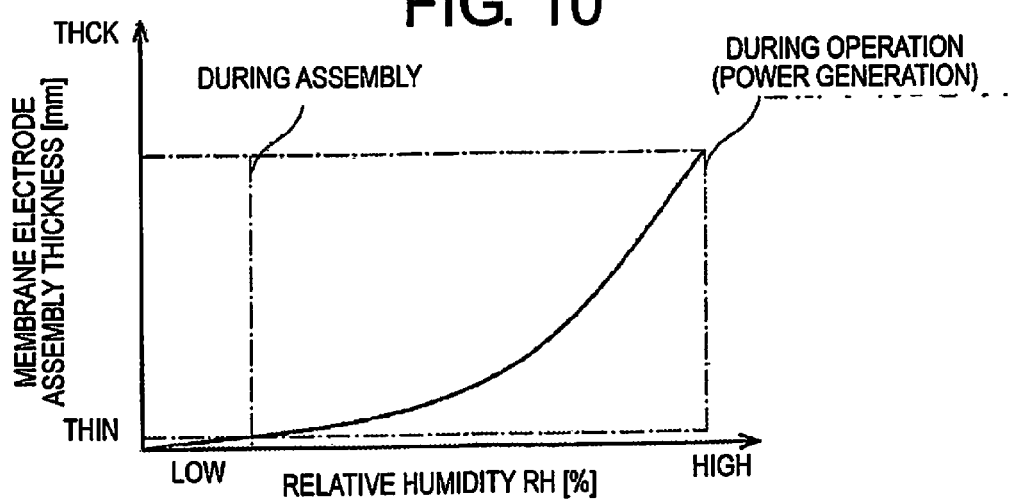
FIG. 11 is a view illustrating the change in the thickness of the membrane electrode assembly accompanying the performance test of the fuel-cell-stack according to the embodiment.

Here, since a medium is supplied to the membrane electrode assembly 30 during the operation (the power generation) of the fuel-cell-stack 1, the relative humidity is increased compared to during the assembly, as illustrated in FIG. 11. Therefore, the membrane electrode assembly 30 is expanded by being humidified by the fuel gas. That is, the membrane electrode assembly 30 is heated and supplied with the humidified gas in order to simulate the thickness during the power generation.

According to the manufacturing method of the fuel-cell-stack 1 and the fuel-cell-stack 1 according to the embodiment described above, the following actions and effects can be achieved.

The fuel-cell-stack 1 manufacturing method according to the embodiment, a separator unit 10, a deformation absorption member 20, and a membrane electrode assembly 30 are used. The separator unit 10 comprises an anode side separator 11 and a cathode side separator 12. The deformation absorption member 20 is disposed between the anode side separator 11 and the cathode side separator 12, and comprises a thin-board-like base material 21, and a plurality of raised pieces 22, each of which is raised from one surface 21*a* of the base material 21 in a grid pattern. The membrane electrode assembly 30 is adjacent to the separator unit 10, and is formed by joining an anode 32 and a cathode 33 so as to face an electrolyte membrane 31. The fuel-cell-stack 1 manufacturing method comprises an arrangement step and a setting step. In the arrangement step, an extension portion (the free end portion 22*b*) extended from the proximal end (the fixed end portion 22*a*) of a raised piece 22 disposed on one surface 21*a* of the base material 21 is disposed so as to be abutted to the cathode side separator 12 or the anode side separator 11. The setting step sets the interval between the anode side separator 11 and the cathode side separator 12 along the lamination direction X so that the deformation of the raised piece 22 exceeds an elastic deformation region and enters a plastic deformation region, and is also in a region in which the proximal end (the fixed end portion 22*a*) that is moved due to the deformation will not come in contact with the cathode side separator 12 or the anode side separator 11.

The fuel-cell-stack 1 according to the embodiment comprises a separator unit 10, a deformation absorption member 20, and a membrane electrode assembly 30. The separator unit 10 comprises an anode side separator 11 and a cathode side separator 12. The deformation absorption member 20 is disposed between the anode side separator 11 and the cathode side separator 12, and comprises a thin-board-like base material 21, and a plurality of raised pieces 22, each of which is raised from one surface 21*a* of the base material 21 in a grid pattern. In the deformation absorption member 20, an extension portion (the free end portion 22*b*) extended from the proximal end (the fixed end portion 22*a*) of a raised piece 22 disposed on one surface 21*a* of the base material 21 is disposed so as to be abutted to the cathode side separator 12 or the anode side separator 11. The membrane electrode assembly 30 is adjacent to the separator unit 10, and is formed by joining an anode 32 and a cathode 33 so as to face an electrolyte membrane 31. Here, the anode side separator 11 and the cathode side separator 12 are arranged while applying a load so that the deformation of the raised piece 22 exceeds an elastic deformation region and enters a plastic deformation region, and is also in a region in which the proximal end (the fixed end portion 22*a*) that is moved due to the deformation will not come in contact with the cathode side separator 12 or the anode side separator 11.

According to a fuel-cell-stack 1 manufacturing method and a fuel-cell-stack 1 configured in this way, that is, according to such a configuration in which the deformation of the raised piece 22 exceeds an elastic deformation region and enters a plastic deformation region, and is also in a region in which the proximal end (the fixed end portion 22*a*) that is moved due to the deformation will not come in contact with the cathode side separator 12 or the anode side separator 11, the raised piece 22 is subjected to plastic deformation to increase the load that can be received from the separator unit 10, while a rapid increase in the load that is applied to the raised piece 22 to create an overload can be prevented by the fixed end portion 22*a* side of the raised piece 22 being deformed and put in contact with the cathode side separator 12. Accordingly, increasing the load that can be received by the raised piece 22 of the deformation absorption member 20 from the separator unit 10 is possible.

In addition, in the fuel-cell-stack 1 manufacturing method, the setting step can be a configuration in which the raised piece 22 is deformed via the cathode side separator 12 and the anode side separator 11, which sandwich the piece.

According to such a configuration, a member that is actually assembled and laminated inside the fuel-cell-stack 1 is used to deform the raised piece 22 according to the manufacturing error that has actually been generated in the lamination member; therefore, the manufacturing error can be effectively absorbed by the raised piece 22. In a jig that is used to uniformly deform the raised piece 22, various manufacturing errors that are actually occurring in the lamination members cannot be sufficiently absorbed.

Furthermore, in the fuel-cell-stack 1 manufacturing method, the setting step can be a configuration in which the raised piece 22 is plastically deformed at the same time as assembly.

According to such a configuration, the step for assembling the fuel-cell-stack 1 and the step for plastically deforming the raised piece 22 can be carried out at the same time rather than separately. In other words, an increase in the cost and the man-hours required for the manufacture of the fuel-cell-stack 1 can be prevented.

Furthermore, in the fuel-cell-stack 1 manufacturing method, the setting step can be a configuration in which the raised piece 22 is subjected to further plastic deformation, by the pressure increase accompanying warming or humidifying that is executed after assembly.

According to such a configuration, an environment in which the fuel-cell-stack 1 is actually operated can be reproduced, and the raised piece 22 can be plastically deformed in advance under that environment. In other words, the raised piece 22 can be plastically deformed assuming the actual use state of the fuel-cell-stack 1, rather than the state at the time of assembling the fuel-cell-stack 1. Therefore, even if the raised piece 22 is further biased during use after the assembly of the fuel-cell-stack 1, the fixed end portion 22a side of the raised piece 22 being put in contact with the cathode side separator 12 and becoming in a state of a both ends supported beam can be prevented. That is, the fuel-cell-stack 1 is able to suppress an excessive increase in the load to prevent damage, etc., of the member, and thereby prevent the load from being excessively increased during use after assembly.

Furthermore, the fuel-cell-stack 1 manufacturing method can be configured so that, by supplying a heated medium to the separator unit 10 and expanding the separator unit 10, the raised piece 22 is subjected to further plastic deformation while reducing the distance of the interval between the anode side separator 11 and the cathode side separator 12 along the lamination direction X to within the range of the plastic deformation region.

According to such a configuration, in an actual use state of the fuel-cell-stack 1, the raised piece 22 can be plastically deformed in advance, assuming a thermal expansion of the separator unit 10 accompanying heat generation, etc., of the membrane electrode assembly 30. Therefore, even if the raised piece 22 is biased by a thermally expanded separator unit 10 during use of the fuel-cell-stack 1, the fixed end portion 22a side thereof being put in contact with the cathode side separator 12 and becoming in a state of a both ends supported beam can be prevented, to prevent the contact resistance from being increased.

Furthermore, the fuel-cell-stack 1 manufacturing method can be configured so that, by supplying a medium to the membrane electrode assembly 30 to humidify and expand the membrane electrode assembly 30, the raised piece 22 is subjected to further plastic deformation while reducing the distance of the interval between the anode side separator 11 and the cathode side separator 12 along the lamination direction X to within the range of the plastic deformation region.

According to such a configuration, in an actual use state of the fuel-cell-stack 1, the raised piece 22 can be plastically deformed in advance, assuming the membrane electrode assembly 30 being humidified and expanded due to the supplied medium. Therefore, even if the raised piece 22 is biased by an expanded membrane electrode assembly 30 during use of the fuel-cell-stack 1, the fixed end portion 22a side thereof being put in contact with the cathode side separator 12 and becoming in a state of a both ends supported beam can be prevented, to prevent the contact resistance from being increased.

Furthermore, the fuel-cell-stack 1 manufacturing method can be configured so that the medium for humidifying and expanding the membrane electrode assembly 30 is supplied after heating to a higher dew point than the temperature of the use state.

According to such a configuration, even if the membrane electrode assembly 30 is expanded to a state of supersaturation, the fixed end portion 22a side of the raised piece 22 being put in contact with the cathode side separator 12 and becoming in a state of a both ends supported beam can be prevented.

Furthermore, the fuel-cell-stack 1 manufacturing method can be configured to use a thermoplastic or a thermosetting sealing member that hermetically seals the outer peripheral edges of at least the separator unit 10 and the membrane electrode assembly 30. By expanding at least the separator unit 10 following the heating for curing the sealing member, the raised piece 22 is subjected to a further plastic deformation while reducing the distance of the interval between the anode side separator 11 and the cathode side separator 12 along the lamination direction X to within the range of the plastic deformation region.

According to such a configuration, upon sealing using a sealing member that is carried out after laminating each member of the fuel-cell-stack 1, the raised piece 22 can be plastically deformed in advance, assuming a thermal expansion of the separator unit 10, etc., following the heating for curing the sealing member. Therefore, after laminating each member at the time of assembling the fuel-cell-stack 1, the raised piece 22 being biased by the thermally expanded separator unit 10 which has been heated together with the sealing member, and the fixed end portion 22a side thereof being put in contact with the cathode side separator 12 to increase the contact resistance can be prevented.

Furthermore, the fuel-cell-stack 1 manufacturing method can be configured so that the pressure applied to the interval between the anode side separator 11 and one membrane electrode assembly 30 and the pressure applied to the interval between the cathode side separator 12 and the other membrane electrode assembly 30 will be higher than the pressure applied to the interval between the anode side separator 11 and the cathode side separator 12 in which is disposed the deformation absorption member 20.

According to such a configuration, even if a pressure difference is generated in the members that are laminated inside the fuel-cell-stack 1, the deformation absorption member 20 is able to sufficiently receive the load that is applied from the separator unit 10.

Furthermore, the fuel-cell-stack 1 can be configured so that the raised piece 22 comprises a curved portion 22c, which is curved protruding in a convex shape toward a direction separating from the cathode side separator 12 or the anode side separator 11, in a region between the proximal end (the fixed end portion 22a) and the extension portion (the free end portion 22b).

According to such a configuration, when the raised piece 22 of the deformation absorption member 20 disposed between the anode side separator 11 and the cathode side separator 12 receives a load and is deformed, the curved portion 22c thereof is abutted to the anode side separator 11. Therefore, the raised piece 22 is able to gently receive the load applied from the anode side separator 11 with the curved portion 22c, and undergo a plastic deformation after an elastic deformation.

Furthermore, the fuel-cell-stack 1 can be configured so that curved portion 22c is provided with a load supporting point 22d for supporting a load received from the anode side separator 11 or the cathode side separator 12, on the side that opposes the anode side separator 11 or the cathode side separator 12. The load supporting point 22d is moved to the extension portion (the free end portion 22b) side along with the deformation of the raised piece 22.

According to such a configuration, even if the raised piece 22 receives a load and is gradually deformed, the load received from the anode side separator 11 can be gradually increased and received, with the portion where the curved portion 22c is abutted to the anode side separator 11 acting as the load supporting point 22d. Therefore, since the load supporting point 22d of the curved portion 22c is moved to the free end portion 22b side following the deformation, a large change is not generated in the state in which the raised piece 22 and the anode side separator 11 apply pressure to each other. Therefore, during the step in which the raised piece 22 receives a load and is deformed, a situation in which, when exceeding a certain location, the load received from the separator unit 10 is rapidly increased, can be prevented.

Furthermore, the fuel-cell-stack 1 can be configured so that the distance of the interval between the anode side separator 11 and the cathode side separator 12 along the lamination direction X will be within the range of the plastic deformation, even if the separator unit 10 expands with the heat generated by the membrane electrode assembly 30, and if the membrane electrode assembly 30 is expanded after absorbing a medium supplied from outside.

Such a configuration allows for a margin in the plastic deformation amount of the raised piece 22, assuming the expansion of the separator unit 10 and the membrane electrode assembly 30 under an actual use state in which the fuel-cell-stack 1 is operated. Therefore, even if the raised piece 22 is biased by the expanded separator unit 10 and the membrane electrode assembly 30 during the use of the fuel-cell-stack 1, the fixed end portion 22a side of the raised piece 22 being put in contact with the cathode side separator 12 and becoming in a state of a both ends supported beam can be prevented. That is, the fuel-cell-stack 1 is able to prevent the contact resistance from being increased during use after assembly.

Furthermore, the fuel-cell-stack 1 can be configured so that the dimensional tolerance of the interval between the anode side separator 11 and the cathode side separator 12 along the lamination direction X is at least greater than the sum of the dimensional tolerance along the lamination direction X, when the separator unit 10 expands with the heat generated by the membrane electrode assembly 30, and the membrane electrode assembly 30 is expanded after absorbing a medium supplied from the outside.

According to such a configuration, the plurality of dimensional tolerances that occur when assembling by laminating each member of the fuel-cell-stack 1 can be absorbed at once. For example, in a state in which a plurality of membrane electrode assemblies 30 and the separator units 10 are laminated together, different dimensional tolerances can be absorbed depending on the lamination position.

Besides the above, various modifications to the present invention based on the configurations described in the Claims are possible, which also belong in the scope of the present invention.

For example, the shape of the raised piece 22 was described as a rectangular shape in which the widths of the extension portion (the free end portion 22b) and the proximal end (the fixed end portion 22a) are equivalent. However, the raised piece 22 is not limited to such a shape, and may be a trapezoidal, a triangular, a semi-circular, a polygonal, or a shape that is a combination thereof.

In addition, a configuration was described in which the plurality of raised pieces 22 are formed so that the directions of the free end portions 22b are aligned in a plurality of rows along another direction Z which intersects the one direction Y. However, the plurality of raised pieces 22 are not limited to such a form, and may be configured so that the directions of the free end portions 22b are alternated per each row, in a plurality of rows along another direction Z which intersects the one direction Y.

The invention claimed is:

1. A fuel-cell-stack manufacturing method, the fuel-cell-stack including
   a separator unit comprising an anode side separator and a cathode side separator,
   a deformation absorption member disposed between the anode side separator and the cathode side separator, and comprising a thin-board-like base material, and a plurality of raised pieces raised from one surface of the base material in a grid pattern, and
   a membrane electrode assembly adjacent to the separator unit, and formed by joining an anode and a cathode so as to face an electrolyte membrane, the method comprising:
   arranging an extension portion extended from a proximal end of a raised piece of the raised pieces on the one surface of the base material to be disposed so as to abut at least one of the cathode side separator and the anode side separator, and
   setting an interval between the anode side separator and the cathode side separator along a lamination direction so that deformation of the raised piece exceeds an elastic deformation region and enters a plastic deformation region, and is also in a region in which the proximal end moved due to the deformation does not come in contact with the cathode side separator or the anode side separator.

2. The fuel-cell-stack manufacturing method according to claim 1, wherein the setting deforms the raised piece via the cathode side separator and the anode side separator which sandwich the raised piece.

3. The fuel-cell-stack manufacturing method according to claim 2, wherein the setting subjects the raised piece to further plastic deformation by a pressure increase accompanying at least one of warming and humidifying that is executed after assembly of the fuel-cell-stack.

4. The fuel-cell-stack manufacturing method according to claim 2, wherein the setting plastically deforms the raised piece at a time of assembly of the fuel-cell-stack.

5. The fuel-cell-stack manufacturing method according to claim 4, wherein the setting subjects the raised piece to further plastic deformation by a pressure increase accompanying at least one of warming and humidifying that is executed after assembly of the fuel-cell-stack.

6. The fuel-cell-stack manufacturing method according to claim 1, wherein the setting subjects the raised piece to further plastic deformation by a pressure increase accompanying at least one of warming and humidifying that is executed after assembly of the fuel-cell-stack.

7. The fuel-cell-stack manufacturing method according to claim 6, wherein the raised piece is subjected to further plastic deformation while reducing the distance of the interval between the anode side separator and the cathode side separator along the lamination direction to within a range of the plastic deformation region, by supplying a heated medium to the separator unit and expanding the separator unit.

8. The fuel-cell-stack manufacturing method according to claim 7, wherein the raised piece is subjected to further plastic deformation while reducing the distance of the interval between the anode side separator and the cathode side separator along the lamination direction to within a range of the plastic deformation region, by supplying a medium to the membrane electrode assembly to humidify and expand the membrane electrode assembly.

9. The fuel-cell-stack manufacturing method according to claim 7, further comprising
at least one of a thermoplastic and a thermosetting sealing member hermetically sealing outer peripheral edges of at least the separator unit and the membrane electrode assembly, and
the raised piece being subjected to further plastic deformation while reducing the distance of the interval between the anode side separator and the cathode side separator along the lamination direction to within a range of the plastic deformation region, by expending at least the separator unit following the heating to cure the sealing member.

10. The fuel-cell-stack manufacturing method according to claim 6, wherein the raised piece is subjected to further plastic deformation while reducing the distance of the interval between the anode side separator and the cathode side separator along the lamination direction to within a range of the plastic deformation region, by supplying a medium to the membrane electrode assembly to humidify and expand the membrane electrode assembly.

11. The fuel-cell-stack manufacturing method according to claim 10, wherein the medium is humidified to a higher dew point than a temperature of a use state.

12. The fuel-cell-stack manufacturing method according to claim 10, further comprising
at least one of a thermoplastic and a thermosetting sealing member hermetically sealing outer peripheral edges of at least the separator unit and the membrane electrode assembly, and
the raised piece being subjected to further plastic deformation while reducing the distance of the interval between the anode side separator and the cathode side separator along the lamination direction to within a range of the plastic deformation region, by expending at least the separator unit following the heating to cure the sealing member.

13. The fuel-cell-stack manufacturing method according to claim 10, further comprising
at least one of a thermoplastic and a thermosetting sealing member hermetically sealing outer peripheral edges of at least the separator unit and the membrane electrode assembly, and
the raised piece being subjected to further plastic deformation while reducing the distance of the interval between the anode side separator and the cathode side separator along the lamination direction to within a range of the plastic deformation region, by expending at least the separator unit following the heating to cure the sealing member.

14. The fuel-cell-stack manufacturing method according to claim 6, further comprising
at least one of a thermoplastic and a thermosetting sealing member hermetically sealing outer peripheral edges of at least the separator unit and the membrane electrode assembly, and
the raised piece being subjected to further plastic deformation while reducing the distance of the interval between the anode side separator and the cathode side separator along the lamination direction to within a range of the plastic deformation region, by expending at least the separator unit following the heating to cure the sealing member.

15. The fuel-cell-stack manufacturing method according to claim 6, wherein pressure applied to the interval between the anode side separator and the membrane electrode assembly and pressure applied to the interval between the cathode side separator and the other membrane electrode assembly are configured to be higher than pressure applied to the interval between the anode side separator and the cathode side separator in which is disposed the deformation absorption member.

* * * * *